(12) United States Patent
Lu

(10) Patent No.: US 9,900,913 B2
(45) Date of Patent: Feb. 20, 2018

(54) METHOD AND DEVICE FOR ADJUSTING CHANNEL FREQUENCY DOMAIN OFFSET OF PHYSICAL RANDOM ACCESS CHANNEL

(71) Applicant: Datang Mobile Communications Equipment Co., Ltd., Beijing (CN)

(72) Inventor: Songhe Lu, Beijing (CN)

(73) Assignee: Datang Mobile Communications Equipment Co., Ltd. (CN)

( * ) Notice: Subject to any disclaimer, the term of this patent is extended or adjusted under 35 U.S.C. 154(b) by 0 days.

(21) Appl. No.: 15/123,095

(22) PCT Filed: Mar. 6, 2015

(86) PCT No.: PCT/CN2015/073728
§ 371 (c)(1),
(2) Date: Sep. 1, 2016

(87) PCT Pub. No.: WO2015/131844
PCT Pub. Date: Sep. 11, 2015

(65) Prior Publication Data
US 2017/0079070 A1    Mar. 16, 2017

(30) Foreign Application Priority Data
Mar. 6, 2014  (CN) .......................... 2014 1 0080538

(51) Int. Cl.
*H04W 74/08* (2009.01)
*H04L 5/00* (2006.01)
(Continued)

(52) U.S. Cl.
CPC ...... *H04W 74/0833* (2013.01); *H04B 17/345* (2015.01); *H04L 5/0053* (2013.01);
(Continued)

(58) Field of Classification Search
None
See application file for complete search history.

(56) References Cited

U.S. PATENT DOCUMENTS

2010/0034174 A1* 2/2010 Nishikawa .......... H04J 11/0023
370/335
2010/0056153 A1    3/2010 Attar et al.
(Continued)

FOREIGN PATENT DOCUMENTS

CN     101873712 A    10/2010
CN     102202399 A     9/2011
(Continued)

OTHER PUBLICATIONS

Supplementary European Search Report dated Jan. 30, 2017, of corresponding European Application No. 15759091.0.
(Continued)

*Primary Examiner* — Andrew Oh
(74) *Attorney, Agent, or Firm* — DLA Piper LLP (US)

(57) ABSTRACT

Provided is a method for adjusting channel frequency domain offset of a physical random access channel (PRACH), comprising: determining the current frequency domain location of a PRACH; obtaining interference over thermal (IOT) values of physical resource blocks (PRB) of all uplink subframes; comparing the IOT values of all the PRBs of the uplink subframes with an IOT detection threshold to determine from all the PRBs of the uplink subframes a plurality of PRBs with the IOT values above the IOT detection threshold; judging whether the plurality of PRBs with IOT values above the IOT detection threshold overlap with the current frequency domain location of the PRACH; if yes, then adjusting the channel frequency domain offset of the current frequency domain location of the PRACH based on a predetermined adjustment rule to determine the adjusted channel frequency domain offset. If the system has
(Continued)

strong IOT or strong burst interference, then the channel location of the PRACH can be adjusted automatically to ensure that a base station can correctly detect and parse a preamble carried by the PRACH, thus ensuring successful access of a UE.

16 Claims, 3 Drawing Sheets

(51) Int. Cl.
  *H04B 17/345* (2015.01)
  *H04W 72/04* (2009.01)
  *H04W 88/08* (2009.01)

(52) U.S. Cl.
  CPC ....... *H04W 72/0446* (2013.01); *H04L 5/0062* (2013.01); *H04L 5/0073* (2013.01); *H04L 5/0085* (2013.01); *H04W 88/08* (2013.01)

(56) References Cited

U.S. PATENT DOCUMENTS

| | | | |
|---|---|---|---|
| 2011/0045856 A1* | 2/2011 | Feng | H04W 72/082 455/501 |
| 2012/0106439 A1* | 5/2012 | Liu | H04W 76/021 370/328 |
| 2012/0307745 A1* | 12/2012 | Panchal | H04W 52/242 370/329 |
| 2012/0329466 A1* | 12/2012 | Su | H04L 5/0073 455/450 |
| 2013/0070696 A1* | 3/2013 | Tang | H04W 52/146 370/329 |
| 2013/0135994 A1* | 5/2013 | Michel | H04W 52/0206 370/229 |
| 2015/0359003 A1* | 12/2015 | Kim | H04W 74/0833 370/336 |

FOREIGN PATENT DOCUMENTS

| | | |
|---|---|---|
| CN | 102763356 A | 10/2012 |
| CN | 103796323 A | 5/2014 |
| EP | 2 439 973 | 4/2012 |
| EP | 2 605 579 | 6/2013 |
| JP | 2008-072540 | 3/2008 |
| JP | 2010-021794 | 1/2010 |
| JP | 2012-501599 | 1/2012 |
| KR | 10-2014-0019152 A | 2/2014 |
| WO | 2009/105003 | 8/2009 |

OTHER PUBLICATIONS

"PRACH configuration index for RACHO," 3GPP Draft; R3-091693, $3^{rd}$ Generation Partnership Project (3GPP), Mobile Competence Centre, China, Aug. 20, 2009.

"Self-configuring and self-optimizing network (SON) use cases and solutions (Release 9)," $3^{rd}$ Generation Partnership Project, Technical Specification Group Radio Access Network, Evolved Universal Terrestrial Radio Access Network, vol. 9.3.1, Mar. 2011, pp. 2-4.

* cited by examiner

METHOD AND DEVICE FOR ADJUSTING CHANNEL FREQUENCY DOMAIN OFFSET OF PHYSICAL RANDOM ACCESS CHANNEL

This application is a U.S. National Stage of International Application No. PCT/CN2015/073728, filed on Mar. 6, 2015, designating the United States, and claiming the benefit of Chinese Patent Application No. 201410080538.8, filed with the Chinese Patent Office on Mar. 6, 2014 and entitled "Method and device for adjusting a channel frequency domain offset of a Physical Random Access Channel (PRACH)", which is hereby incorporated by reference in its entirety.

FIELD

This application relates to the field of mobile communications, and particularly to a method and device for adjusting a channel frequency-domain offset of a Physical Random Access Channel (PRACH).

BACKGROUND

The 3G technology has become a predominant field of researches on such modern mobile communications that increasingly tend to provide multimedia services transmitted at a high rate. The 3rd Generation Partnership Project (3GPP) is devoted to put the Long Term Evolution (LTE) system as the evolvement of the 3G system. Long Term Evolution-Advanced (LTE-A) is subsequent evolvement of the LTE technology, which is commonly referred to as 3.9G As compared with the 4G standard, all the technical indexes of the Long Term Evolution (LTE) except for the maximum bandwidth and the uplink peak rate, both of which are slightly inferior to the 4G standard, have satisfied the 4G standard.

In the LTE system, a Physical Random Access Channel (PRACH) is an uplink random access channel, and upon reception of a Fast Physical Access Channel (FPACH) response message, a User Equipment (UE) transmits a Radio Resource control (RRC) message over a PRACH channel according to indication information of a base station to set up an RRC connection. If there are a number of PRACH channels, then the UE will select corresponding one of the PRACH channels according to information indicated in the FPACH.

The LTE system configures an uplink PRACH channel so that one PRACH channel occupies 6 Physical Resource Blocks (PRBs) consecutive in frequency domain, where a primary parameter of the PRACH in time domain is the preamble format, and if the preamble format of the PRACH channel ranges from 0 to 3, then a channel frequency domain offset of the PRACH will be configured, where the channel frequency domain offset may have a direct influence upon a frequency domain position at which the UE transmits the uplink PRACH channel, and a frequency domain position at which the base station receives the uplink PRACH channel.

In the prior art, the channel frequency domain position of the PRACH is generally initialized in a cell, and then configured manually or by importing an initialization file, and since the channel frequency domain offset is configured before the cell is deployed, it may not be adjusted adaptively to the current communication environment of the cell.

The position at which the base station detects a preamble in the uplink is determined by the frequency domain position information of the PRACH configured by the base station, and if there is significantly noise floor rising in the frequency band, or there is strong interference busting in the frequency band, then if the power of the interference or the noise is higher than the power of a useful signal, then the base station may not detect and decrypt the preamble carried in the PRACH channel, so that the UE may not access the system, thus degrading an access success rate throughout the system.

In view of this, it is desirable to propose an effective technical solution to solve such a problem that the channel frequency domain position of the PRACH may not be adjusted adaptively to the current communication environment of the cell.

SUMMARY

This application provides a method and device for adjusting a channel frequency domain offset of a Physical Random Access Channel (PRACH) so as to address the drawback above in the prior art, and particularly such a problem that the channel frequency domain position of the PRACH may not be adjusted adaptively to the current communication environment of the cell.

In order to address the problem above, an embodiment of the application provides a method for adjusting a channel frequency domain offset of a Physical Random Access Channel (PRACH), the method includes:

determining a current frequency domain position of the PRACH;

v. obtaining Interference Over Thermal (IOT) values of all the Physical Resource Blocks (PRBs) in an uplink subframe;

w. comparing the IOT values of all the PRBs in the uplink subframe with an IOT detection threshold to determine a number of PRBs with their IOT values above the IOT detection threshold among all the PRBs in the uplink subframe;

x. judging whether the PRBs with their IOT values above the IOT detection threshold overlap with the current frequency domain position of the PRACH; and y. if it is determined that there are overlapping frequency domain positions, then adjusting a channel frequency domain offset for the current frequency domain position of the PRACH under a preset adjustment rule to determine an adjusted channel frequency domain offset.

An embodiment of the application further provides a base station device for adjusting a channel frequency domain offset of a Physical Random Access Channel (PRACH), the base station device includes a determining module, an obtaining module, a comparing module, a judging module, and an adjusting module, wherein:

the determining module is configured to determine a current frequency domain position of the PRACH;

the obtaining module is configured to obtain Interference Over Thermal (IOT) values of all the Physical Resource Blocks (PRBs) in an uplink subframe;

the comparing module is configured to compare the IOT values of all the PRBs in the uplink subframe with an IOT detection threshold to determine a number of PRBs with their IOT values above the IOT detection threshold among all the PRBs in the uplink subframe;

the judging module is configured to judge whether the PRBs with their IOT values above the IOT detection threshold overlap with the current frequency domain position of the PRACH;

the adjusting module is configured, if it is determined that there are overlapping frequency domain positions, to adjust a channel frequency domain offset for the current frequency domain position of the PRACH under a preset adjustment rule to determine an adjusted channel frequency domain offset.

Advantageous effects of the embodiments of the application are as follows:

Since the channel frequency domain offset of the PRACH can be adjusted adaptively to the current communication environment, if there is significantly noise floor rising, or strong interference busting, in the system, then the channel positional of the PRACH can be adjusted automatically from the interference position so that the base station can correctly detect and decrypt a preamble carried in the PRACH channel, thus enabling the UE to access the base station successfully.

With the solutions above according to this application, the existing system has been modified slightly without affecting the compatibility of the system, and the solutions can be implemented easily and efficiently.

DETAILED DESCRIPTION OF THE EMBODIMENTS

Figure 1:
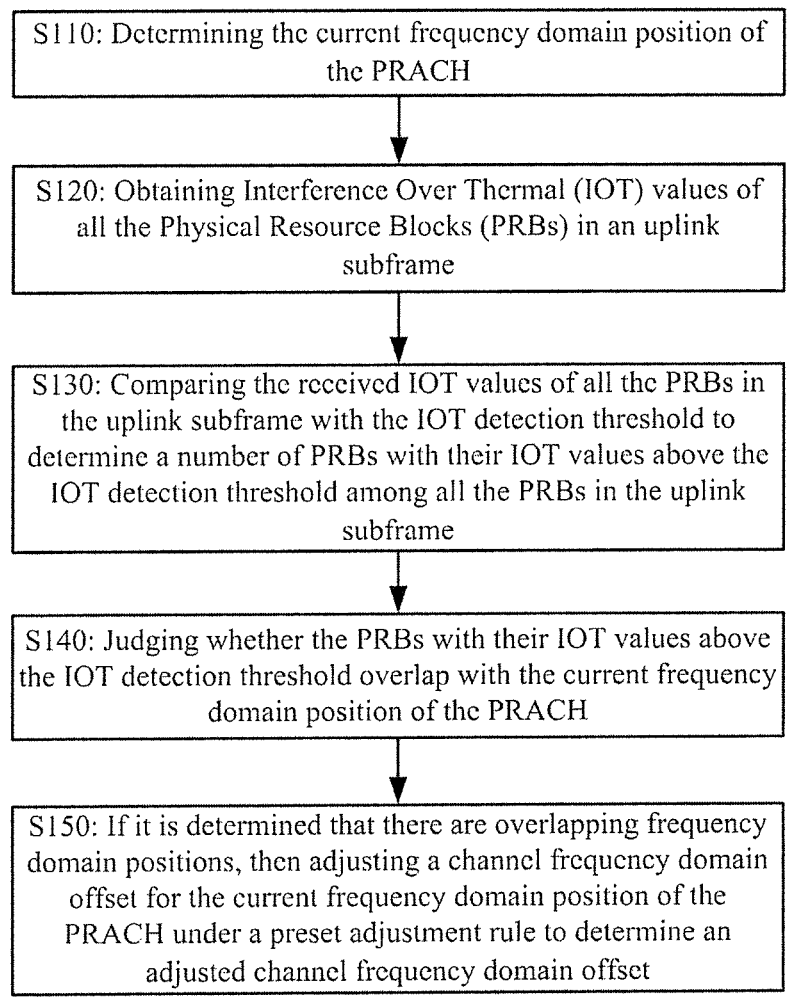
FIG. 1 is a flow chart of a method for adjusting a channel frequency domain offset of a Physical Random Access Channel (PRACH) according to an embodiment of the application.

FIG. 1 illustrates a flow chart of a method for adjusting a channel frequency domain offset of a Physical Random Access Channel (PRACH) according to an embodiment of the application.

In the operation S110, a base station device determines the current frequency domain position of the PRACH.

Here the current frequency domain position of the PRACH includes but will not be limited to an initial default frequency domain position of the PRACH, and a current frequency domain position after the frequency domain position of the PRACH is updated.

Particularly the base station device obtains the initial default frequency domain position of the PRACH configured while initializing a cell, or the base station device obtains the frequency domain position of the PRACH updated by the system.

In the operation S120, the base station device obtains Interference Over Thermal (IOT) values of all the Physical Resource Blocks (PRBs) in an uplink subframe.

Here the IOT is an index reflecting a general interference condition of a channel. For example, there is no interference in the current uplink channel, and the noise floor thereof is −99 dBm, and if there is interference bursting in the channel so that the noise floor will rise to −60 dBm, then the IOT value will be 39 dB (=−60 dBm−(−99 dBm)).

Particularly in the operation S120, the Physical Layer (PL) in the base station device can measure at a preset period or randomly the IOT values of all the PRBs in the uplink subframe, and thereafter report the IOT values of all the PRBs in the uplink subframe to the High Layer (HL).

In the operation S130, the base station device compares the IOT values of all the PRBs in the uplink subframe with an IOT detection threshold to determine a number of PRBs with their IOT values above the IOT detection threshold among all the PRBs in the uplink subframe.

Particularly in the operation S130, the HL in the base station device compares the received IOT values of all the PRBs in the uplink subframe with the IOT detection threshold to determine a number of PRBs with their IOT values above the IOT detection threshold among all the PRBs in the uplink subframe.

In the operation S140, the base station device judges whether the PRBs with their IOT values above the IOT detection threshold overlap with the current frequency domain position of the PRACH.

Particularly the HL in the base station device judges whether the PRBs with their IOT values above the IOT detection threshold overlap with the current frequency domain position of the PRACH.

In the operation S150, if it is determined that there are overlapping frequency domain positions, then the base station device will adjust a channel frequency domain offset for the current frequency domain position of the PRACH under a preset adjustment rule to determine an adjusted channel frequency domain offset.

Here the channel frequency domain offset for the current frequency domain position of the PRACH can be adjusted under the preset adjustment rule as follows without any limitation thereto:

1) The operation S151 (not illustrated) and the operation S152 (not illustrated) are performed, where in the operation S151, the base station device selects and determines any one PRB group including 6 consecutive PRBs from the PRBs with their IOT values below the IOT detection threshold among all the PRBs as an adjusted frequency domain position of the PRACH; and in the operation S152, the base station device adjusts the channel frequency domain offset according to the adjusted frequency domain position of the PRACH.

2) The operation S153 (not illustrated), the operation S154 (not illustrated), and the operation S155 (not illustrated) are performed, where in the operation S153, the base station device removes the PRBs reserved for a Physical Uplink Control Channel (PUCCH) from the PRBs with their IOT values below the IOT detection threshold among all the PRBs; in the operation S154, the base station device selects and determines any one PRB group including 6 consecutive PRBs from the remaining PRBs as an adjusted frequency domain position of the PRACH; and in the operation S155, the base station device adjusts the channel frequency domain offset according to the adjusted frequency domain position of the PRACH.

Here in the LTE system, such a number of PRBs in the uplink channel need to be reserved for a PUCCH, and the PRBs for the PUCCH are located respectively at both ends of available spectrum resources.

In an example, in the operation S153, 40 PRBs need to be reserved for a PUCCH, and the base station device removes respective 20 PRBs located at both ends of the spectrum from the PRBs with their IOT values below the IOT detection threshold among all the PRBs; in the operation S154, the base station device selects and determines any one PRB group including 6 consecutive PRBs from the remaining PRBs as an the adjusted frequency domain position of the PRACH; and in the operation S155, the base station device adjusts the channel frequency domain offset according to the adjusted frequency domain position of the PRACH.

Preferably if there are a number of PRB groups including 6 consecutive PRBs among the remaining PRBs, then the operation S157 (not illustrated), the operation S158 (not illustrated), and the operation S159 (not illustrated) will be performed, where in the operation S157, the base station device determines position information of an interference frequency band; in the operation S158, the base station device selects and determines, from the PRB groups including 6 PRBs, such a PRB group with an interval between which and the positional information of the interference frequency band is maximum as an adjusted frequency domain position of the PRACH; and in the operation S159, the base station device adjusts the channel frequency domain offset according to the adjusted frequency domain position of the PRACH.

Particularly in the operation S157, the base station determines the position information of the interference frequency band, for example, by determining the PRBs with their IOT values above the IOT detection threshold as the position information of the interference frequency band; in the operation S158, the base station device selects and determines, from the PRB groups including 6 PRBs, such a PRB group with an interval between which and the position information of the interference frequency band is maximum as an adjusted frequency domain position of the PRACH; and in the operation S159, the base station device adjusts the channel frequency domain offset according to the adjusted frequency domain position of the PRACH.

In the operation S140, if the base station device judges that none of the PRBs with their IOT values above the IOT detection threshold overlaps with the current frequency domain position of the PRACH, then the base station device will not perform the adjustment process above, and a user equipment will access normally.

In the TDD-LTE system, before the operations above are performed, firstly the HL in the base station device determines a subframe in time domain in which the PRACH is transmitted, i.e., the position in time domain at which it is transmitted, and particularly the subframe in time domain in which the PRACH is transmitted is a system preset parameter configured before a cell is deployed; next the PL reports all the IOT values of the uplink subframes in frequency domain to the HL, and the HL determines all the IOT values of the uplink subframe including the determined subframe in time domain in which the PRACH is transmitted, according to the determined subframe in time domain in which the PRACH is transmitted; and thereafter the base station device further performs the operation S110, the operation S120, the operation S130, the operation S140, and the operation S150 above.

Since the channel frequency domain offset of the PRACH can be adjusted adaptively to the current communication environment, if there is significantly noise floor rising or strong interference busting in the system, then the channel position of the PRACH can be adjusted automatically from the interference position so that the base station can correctly detect and decrypt a preamble carried in the PRACH channel, thus enabling the UE to access the base station successfully.

Figure 2:
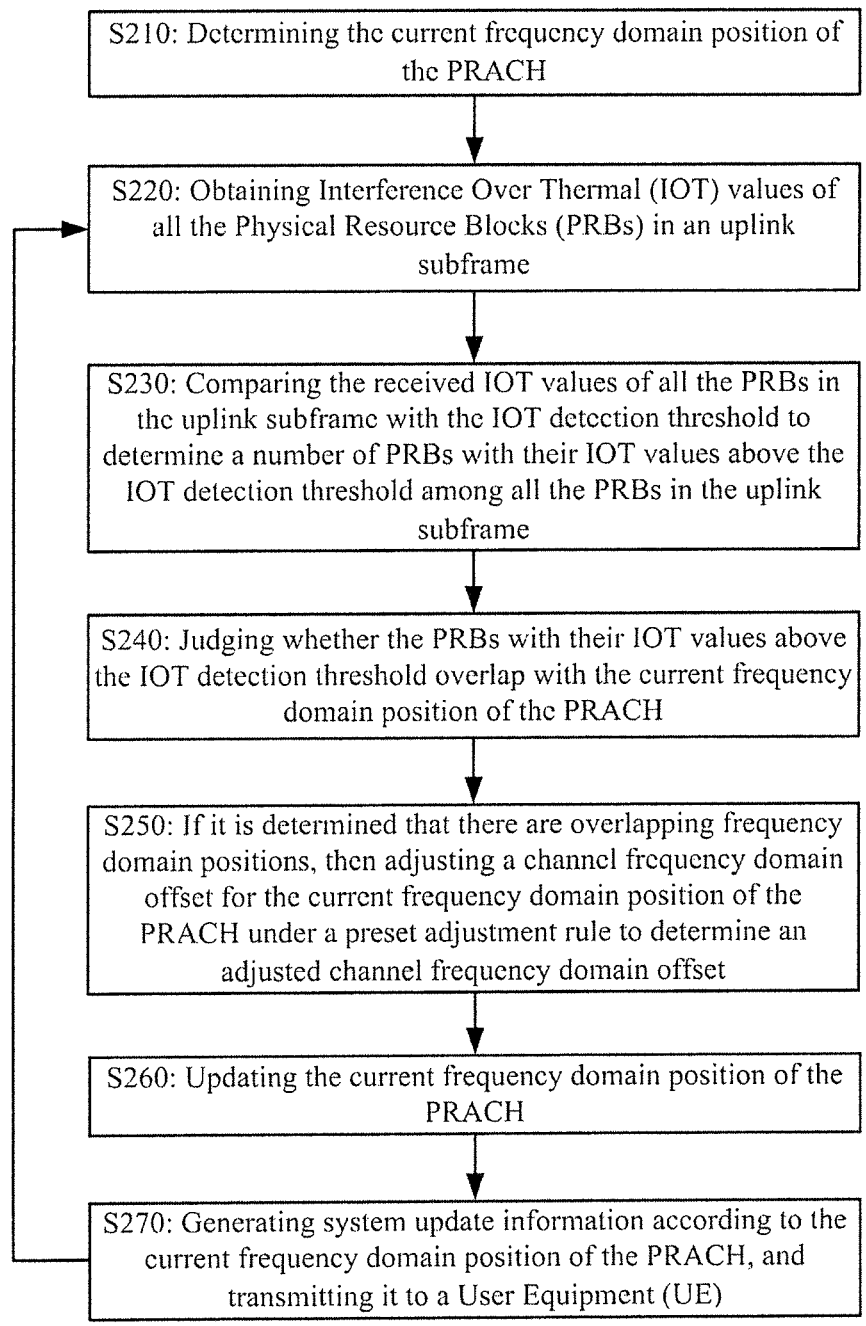
FIG. 2 is a flow chart of a method for adjusting a channel frequency domain offset of a Physical Random Access Channel (PRACH) according to an embodiment of the application.

FIG. 2 illustrates a flow chart of a method for adjusting a channel frequency domain offset of a Physical Random Access Channel (PRACH) according to an embodiment of the application.

The method for adjusting a channel frequency domain offset of a PRACH further includes the operation S260 and the operation S270, where in the operation S260, the base station device updates the current frequency domain position of the PRACH; and in the operation S270, the base station device generates system update information according to the current frequency domain position of the PRACH, and transmits it to the UE. At a preset period, the base station device obtains the Interference Over Thermal (IOT) values of all the Physical Resource Blocks (PRB) in the uplink subframe repeatedly in the operation S220; compares the IOT values of all the PRBs in the uplink subframe with the IOT detection threshold repeatedly in the operation S230 to determine a number of PRBs with their IOT values above the IOT detection threshold among all the PRBs in the uplink subframe; and judges whether the PRBs with their IOT values above the IOT detection threshold overlap with the current frequency domain position of the PRACH repeatedly in the operation S240; and if it is determined that there are overlapping frequency domain positions, then the base station device will adjust the channel frequency domain offset for the current frequency domain position of the PRACH under the preset adjustment rule to determine the adjusted channel frequency domain offset repeatedly in the operation S250; and updates the current frequency domain position of the PRACH repeatedly in the operation S260; and generates the system update information according to the current frequency domain position of the PRACH, and transmits it to the UE repeatedly in the operation S270.

Particularly in the operation S260, the HL in the base station device issues the adjusted channel frequency domain offset to the PL, and the PL updates the current frequency domain position of the PRACH according to the adjusted channel frequency domain offset; in the operation S270, the base station device generates the system update information according to the current frequency domain position of the PRACH, and transmits it to the UE, so that the UE can access the network according to the current frequency domain position; and if the base station device obtains the IOT values of the Physical Resource Blocks (PRB)s in all the uplink subframes repeatedly at the preset period in the operation S220, then the base station device will perform the operation S230, the operation S240, the operation S250, the operation S260, and the operation S270 repeatedly, where the base station device performs the operation S210, the operation S220, the operation S230, the operation S240, and the operation S250 in the same or similar way to the way in which it performs the operation S110, the operation S120, the operation S130, the operation S140, and the operation S150, so a repeated description thereof will be omitted here.

Since the channel frequency domain offset of the PRACH can be constantly adjusted adaptively to the current communication environment, if there is significantly noise floor rising, or strong interference busting, in the system, then the channel position of the PRACH can be adjusted automatically from the interference position so that on one hand, the system can be adapted to the varying environment more stably to thereby guarantee the success rate of the UE accessing the network over a long period of time; and on the other hand, the channel frequency domain offset will not be modified manually in the system for a number of times to thereby lower the operation complexity of optimizing and planning the network by a human operator so as to lower a labor cost; and furthermore the flexibility of the system can be improved to thereby facilitate the adaptation thereof to a complex test scenario.

Figure 3:
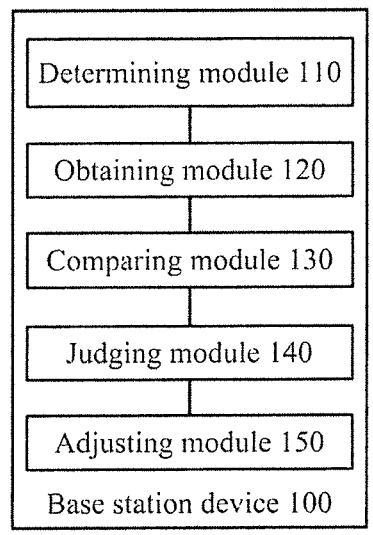
FIG. 3 is a schematic structure diagram of a device for adjusting a channel frequency domain offset of a Physical Random Access Channel (PRACH) according to an embodiment of the application.

FIG. 3 illustrates a schematic structure diagram of a device for adjusting a channel frequency domain offset of a Physical Random Access Channel (PRACH) according to an embodiment of the application.

Here the base station device 100 includes a determining module 110, an obtaining module 120, a comparing module 130, a judging module 140, and an adjusting module 150, where:

Firstly the determining module 110 determines the current frequency domain position of the PRACH.

Here the current frequency domain position of the PRACH includes but will not be limited to an initial default frequency domain position of the PRACH, and a current frequency domain position after the frequency domain position of the PRACH is updated.

Particularly the determining module 110 obtains the initial default frequency domain position of the PRACH configured while initializing a cell, or the base station device obtains the frequency domain position of the PRACH updated by the system.

Next the obtaining module 120 obtains Interference Over Thermal (IOT) values of all the Physical Resource Blocks (PRBs) in an uplink subframe.

Here the IOT is an index reflecting a general interference condition of a channel. For example, there is no interference in the current uplink channel, and the noise floor thereof is −99 dBm, if there is interference bursting in the channel so that the noise floor will rise to −60 dBm, then the IOT value will be 39 dB (=−60 dBm−(−99 dBm)).

Particularly the obtaining module 120 can measure at a preset period or randomly the IOT values of all the PRBs in the uplink subframe.

Thereafter the comparing module 130 compares the IOT values of all the PRBs in the uplink subframe obtained by the obtaining module 120 with an IOT detection threshold to determine a number of PRBs with their IOT values above the IOT detection threshold among all the PRBs in the uplink subframe.

Particularly the comparing module 130 compares the IOT values of all the PRBs in the uplink subframe with the IOT detection threshold to determine a number of PRBs with their IOT values above the IOT detection threshold among all the PRBs in the uplink subframe.

Thereafter the judging module 140 judges whether the PRBs with their IOT values above the IOT detection threshold overlap with the current frequency domain position of the PRACH.

Particularly the judging module 140 judges whether the PRBs with their IOT values above the IOT detection threshold overlap with the current frequency domain position of the PRACH.

If it is determined that there are overlapping frequency domain positions, then the adjusting module 150 will adjust a channel frequency domain offset for the current frequency domain position of the PRACH under a preset adjustment rule to determine an adjusted channel frequency domain offset.

Here the channel frequency domain offset for the current frequency domain position of the PRACH can be adjusted under the preset adjustment rule as follows without any limitation thereto:

1) Preferably the adjusting module 150 includes a first determining unit (not illustrated) and a first adjusting unit (not illustrated), where the first determining unit selects and determines any one PRB group including 6 consecutive PRBs from the PRBs with their IOT values below the IOT detection threshold among all the PRBs as an adjusted frequency domain position of the PRACH; and the first adjusting unit adjusts the channel frequency domain offset according to the adjusted frequency domain position of the PRACH.

2) Preferably the adjusting module 150 includes a removing unit (not illustrated), a second determining unit (not illustrated), and a second adjusting unit (not illustrated), where the removing unit removes the PRBs reserved for a Physical Uplink Control Channel (PUCCH) from the PRBs with their IOT values below the IOT detection threshold among all the PRBs; the second determining unit selects and determines any one PRB group including 6 consecutive PRBs from the remaining PRBs as an adjusted frequency domain position of the PRACH; and the second adjusting unit adjusts the channel frequency domain offset according to the adjusted frequency domain position of the PRACH.

Here in the LTE system, such a number of PRBs in the uplink channel need to be reserved for a PUCCH, and the PRBs for the PUCCH are located respectively at both ends of available spectrum resources.

In an example, if 40 PRBs need to be reserved for a PUCCH, then the removing unit will remove respective 20 PRBs located at both ends of the spectrum from the PRBs with their IOT values below the IOT detection threshold among all the PRBs; the second determining unit will select and determine any one PRB group including 6 consecutive PRBs from the remaining PRBs as an the adjusted frequency domain position of the PRACH; and the second adjusting unit will adjust the channel frequency domain offset according to the adjusted frequency domain position of the PRACH.

Preferably if there are a number of PRB groups including 6 consecutive PRBs among the remaining PRBs, then the adjusting module 150 will include a third determining unit (not illustrated), a fourth determining unit (not illustrated), and a third adjusting unit (not illustrated), where the third determining unit determines position information of an interference frequency band; the fourth determining unit device selects and determines, from the PRB groups including 6 PRBs, such a PRB group with an interval between which and the position information of the interference frequency band is maximum as an adjusted frequency domain position of the PRACH; and the third adjusting unit adjusts the channel frequency domain offset according to the adjusted frequency domain position of the PRACH.

Particularly the third determining unit determines the position information of the interference frequency band, for example, by determining the PRBs with their IOT values above the IOT detection threshold as the position information of the interference frequency band; the fourth determining unit selects and determines, from the PRB groups including 6 PRBs, such a PRB group with an interval between which and the position information of the interference frequency band is maximum as an adjusted frequency domain position of the PRACH; and the third adjusting unit adjusts the channel frequency domain offset according to the adjusted frequency domain position of the PRACH.

If the judging unit 140 judges that none of the PRBs with their IOT values above the IOT detection threshold overlaps with the current frequency domain position of the PRACH, then the base station device will not perform the adjustment process above, and a user equipment will access normally.

In the TDD-LTE system, before the determining module 110 performs its function, firstly the HL in the base station device determines a subframe in time domain in which the PRACH is transmitted, i.e., the position in time domain at which it is transmitted, and particularly the subframe in time domain in which the PRACH is transmitted is a system preset parameter configured before a cell is deployed; next the PL reports all the IOT values of the uplink subframes in frequency domain to the HL, and the HL determines all the IOT values of the uplink subframe including the determined subframe in time domain in which the PRACH is transmitted, according to the determined subframe in time domain in which the PRACH is transmitted; and thereafter the determining module 110, the obtaining module 120, the comparing module 130, the judging module 140, and the adjusting module 150 further perform their respective functions.

Since the channel frequency domain offset of the PRACH can be adjusted adaptively to the current communication environment, if there is significantly noise floor rising or strong interference busting in the system, then the channel position of the PRACH can be adjusted automatically from the interference position so that the base station can correctly detect and decrypt a preamble carried in the PRACH channel, thus enabling the UE to access the base station successfully.

Figure 4:
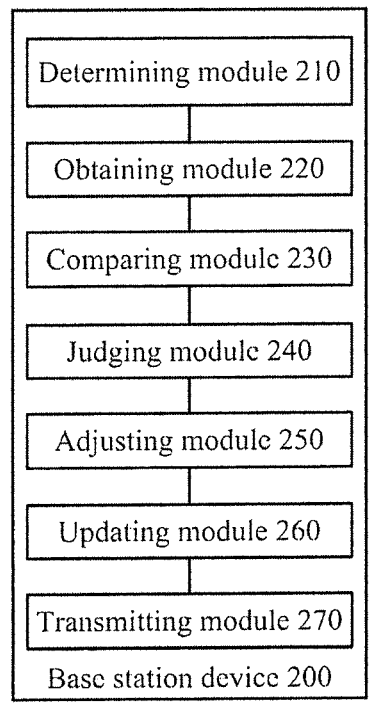
FIG. 4 is a schematic structure diagram of a device for adjusting a channel frequency domain offset of a Physical Random Access Channel (PRACH) according to an embodiment of the application.

FIG. 4 illustrates a schematic structure diagram for adjusting a channel frequency domain offset of a Physical Random Access Channel (PRACH) according to an embodiment of the application.

The base station device 100 includes a determining module 210, an obtaining module 220, a comparing module 230, a judging module 240, an adjusting module 250, an updating module 260, and a transmitting module 270, where at a preset period, the obtaining module 220 obtains the Interference Over Thermal (IOT) values of all the Physical Resource Blocks (PRB) in the uplink subframe repeatedly; the comparing module 230 compares the IOT values of all the PRBs in the uplink subframe with the IOT detection threshold repeatedly to determine a number of PRBs with their IOT values above the IOT detection threshold among all the PRBs in the uplink subframe; the judging module 240 judges whether the PRBs with their IOT values above the IOT detection threshold overlap with the current frequency domain position of the PRACH repeatedly; if it is judged that there are overlapping frequency domain positions, then the adjusting module 250 will adjust the channel frequency domain offset for the current frequency domain position of the PRACH under the preset adjustment rule to determine the adjusted channel frequency domain offset repeatedly; the updating module 260 updates the current frequency domain position of the PRACH repeatedly; and the transmitting module 270 generates the system update information according to the current frequency domain position of the PRACH, and transmits it to the UE repeatedly. Here the determining module 210, the obtaining module 220, the comparing module 230, the judging module 240, and the adjusting module 250 function in the same or similar way as the determining module 110, the obtaining module 120, the comparing module 130, the judging module 140, and the adjusting module 150 in FIG. 3, so a repeated description thereof will be omitted here.

Particularly the updating module 260 updates the current frequency domain position of the PRACH according to the adjusted channel frequency domain offset; the transmitting module 270 generates the system update information according to the current frequency domain position of the PRACH, and transmits it to the UE, so that the UE can access the network according to the current frequency domain position. When the obtaining module 220 obtains the IOT values of all the Physical Resource Blocks (PRBs) in the uplink subframe at the preset period, then the comparing module 230, the judging module 240, the adjusting module 250, the updating module 260, and the transmitting module 270 will perform their respective functions repeatedly.

Since the channel frequency domain offset of the PRACH can be constantly adjusted adaptively to the current communication environment, if there is significantly noise floor rising, or strong interference busting, in the system, then the channel position of the PRACH can be adjusted automatically from the interference position so that on one hand, the system can be adapted to the varying environment more stably to thereby guarantee the success rate of the UE accessing the network over a long period of time; and on the other hand, the channel frequency domain offset will not be modified manually in the system for a number of times to thereby lower the operation complexity of optimizing and planning the network by a human operator so as to lower a labor cost; and furthermore the flexibility of the system can be improved to thereby facilitate the adaptation thereof to a complex test scenario.

Those ordinarily skilled in the art can appreciate that all or a part of the operations in the methods according to the embodiments can be performed in program instructing relevant hardware, and the program can be stored in a computer readable storage medium and perform when being executed any one or combination of the operations in the embodiments of the methods.

Additionally the respective units in the respective embodiments of the application can be integrated in a processing module or physically present separately from each other, or two or more of the units can be integrated in a module. The integrated module can be embodied in the form of hardware or a software functional module. The integrated module can also be stored in a computer readable storage medium if it is embodied in the form of a software functional module and sold or used as a stand-alone product.

The storage medium mentioned above can be a read-only memory, a magnetic disk, an optical disk, etc.

The foregoing description is merely a part of embodiments of the application, and it shall be noted that those ordinarily skilled in the art can further make several modifications and variations thereto without departing the principle of the application and that these modifications and variations shall also be deemed as coming into the claimed scope of the application.

The invention claimed is:

1. A method for adjusting a channel frequency domain offset of a Physical Random Access Channel, PRACH, the method comprising operations of:
   determining a current frequency domain position of the PRACH;
   u. obtaining Interference Over Thermal, IOT, values of all Physical Resource Blocks, PRBs, in an uplink subframe;
   v. comparing the IOT values of all the PRBs in the uplink subframe with an IOT detection threshold to determine a number of PRBs with their IOT values above the IOT detection threshold among all the PRBs in the uplink subframe;
   w. judging whether the PRBs with their IOT values above the IOT detection threshold overlap with the current frequency domain position of the PRACH; and
   x. if it is determined that there are overlapping frequency domain positions, then adjusting a channel frequency domain offset for the current frequency domain position of the PRACH under a preset adjustment rule to determine an adjusted channel frequency domain offset.

2. The method according to claim 1, further comprising:
y. updating the current frequency domain position of the PRACH;
z. generating system update information according to the current frequency domain position of the PRACH, and transmitting it to a User Equipment, UE; and
repeating the operations of u, v, w, x, y, and z at a preset period.

3. The method according to claim 2, wherein the adjusting the channel frequency domain offset for the current frequency domain position of the PRACH under the preset adjustment rule comprises:
selecting and determining any one PRB group comprising 6 consecutive PRBs from PRBs with their IOT values below the IOT detection threshold among all the PRBs as an adjusted frequency domain position of the PRACH; and
adjusting the channel frequency domain offset according to the adjusted frequency domain position of the PRACH.

4. The method according to claim 2, wherein the adjusting the channel frequency domain offset for the current frequency domain position of the PRACH under the preset adjustment rule comprises:
removing PRBs reserved for a Physical Uplink Control Channel, PUCCH, from PRBs with their IOT values below the IOT detection threshold among all the PRBs;
selecting and determining any one PRB group comprising 6 consecutive PRBs from remaining PRBs as an adjusted frequency domain position of the PRACH; and
adjusting the channel frequency domain offset according to the adjusted frequency domain position of the PRACH.

5. The method according to claim 1, wherein the adjusting the channel frequency domain offset for the current frequency domain position of the PRACH under the preset adjustment rule comprises:
selecting and determining any one PRB group comprising 6 consecutive PRBs from PRBs with their IOT values below the IOT detection threshold among all the PRBs as an adjusted frequency domain position of the PRACH; and
adjusting the channel frequency domain offset according to the adjusted frequency domain position of the PRACH.

6. The method according to claim 1, wherein the adjusting the channel frequency domain offset for the current frequency domain position of the PRACH under the preset adjustment rule comprises:
removing PRBs reserved for a Physical Uplink Control Channel, PUCCH, from PRBs with their IOT values below the IOT detection threshold among all the PRBs;
selecting and determining any one PRB group comprising 6 consecutive PRBs from remaining PRBs as an adjusted frequency domain position of the PRACH; and
adjusting the channel frequency domain offset according to the adjusted frequency domain position of the PRACH.

7. The method according to claim 6, wherein if there are a number of PRB groups comprising 6 consecutive PRBs among the remaining PRBs, then the adjusting the channel frequency domain offset for the current frequency domain position of the PRACH under the preset adjustment rule comprises:
determining position information of an interference frequency band;
selecting and determining, from the PRB groups comprising 6 PRBs, such a PRB group with an interval between which and the position information of the interference frequency band as an adjusted frequency domain position of the PRACH; and
adjusting the channel frequency domain offset according to the adjusted frequency domain position of the PRACH.

8. The method according to claim 1, wherein the current frequency domain position of the PRACH comprises an initial default frequency domain position of the PRACH.

9. A base station device for adjusting a channel frequency domain offset of a Physical Random Access Channel, PRACH, wherein the base station device comprises a determining module, an obtaining module, a comparing module, a judging module, and an adjusting module, wherein:
the determining module is configured to determine a current frequency domain position of the PRACH;
the obtaining module is configured to obtain Interference Over Thermal, IOT, values of all Physical Resource Blocks, PRBs, in an uplink subframe;
the comparing module is configured to compare the IOT values of all the PRBs in the uplink subframe with an IOT detection threshold to determine a number of PRBs with their IOT values above the IOT detection threshold among all the PRBs in the uplink subframe;
the judging module is configured to judge whether the PRBs with their IOT values above the IOT detection threshold overlap with the current frequency domain position of the PRACH;
the adjusting module is configured, if it is determined that there are overlapping frequency domain positions, to adjust a channel frequency domain offset for the current frequency domain position of the PRACH under a preset adjustment rule to determine an adjusted channel frequency domain offset.

10. The base station device according to claim 9, further comprising an updating module and a transmitting module, wherein:
the updating module is configured to update the current frequency domain position of the PRACH; and
the transmitting module is configured to generate system update information according to the current frequency domain position of the PRACH, and to transmit it to a User Equipment, UE; and
the determining module, the obtaining module, the comparing module, the judging module, the adjusting module, the updating module, and the transmitting module repeat their respective operations at a preset period.

11. The base station device according to claim 10, wherein the adjusting module is configured:
to select and determine any one PRB group comprising 6 consecutive PRBs from PRBs with their IOT values below the IOT detection threshold among all the PRBs as an adjusted frequency domain position of the PRACH; and
to adjust the channel frequency domain offset according to the adjusted frequency domain position of the PRACH.

12. The base station device according to claim 10, wherein the adjusting module is configured:

to remove PRBs reserved for a Physical Uplink Control Channel, PUCCH, from PRBs with their IOT values below the IOT detection threshold among all the PRBs;

to select and determine any one PRB group comprising 6 consecutive PRBs from the remaining PRBs as an adjusted frequency domain position of the PRACH; and to adjust the channel frequency domain offset according to the adjusted frequency domain position of the PRACH.

13. The base station device according to claim 9, wherein the adjusting module is configured:

to select and determine any one PRB group comprising 6 consecutive PRBs from PRBs with their IOT values below the IOT detection threshold among all the PRBs as an adjusted frequency domain position of the PRACH; and to adjust the channel frequency domain offset according to the adjusted frequency domain position of the PRACH.

14. The base station device according to claim 9, wherein the adjusting module is configured:

to remove PRBs reserved for a Physical Uplink Control Channel, PUCCH, from PRBs with their IOT values below the IOT detection threshold among all the PRBs;

to select and determine any one PRB group comprising 6 consecutive PRBs from the remaining PRBs as an adjusted frequency domain position of the PRACH; and to adjust the channel frequency domain offset according to the adjusted frequency domain position of the PRACH.

15. The base station device according to claim 14, wherein if there are a number of PRB groups comprising 6 consecutive PRBs among the remaining PRBs, then the adjusting module is configured:

to determine position information of an interference frequency band;

to select and determine from the PRB groups comprising 6 PRBs, such a PRB group with an interval between which and the position information of the interference frequency band as an adjusted frequency domain position of the PRACH; and to adjust the channel frequency domain offset according to the adjusted frequency domain position of the PRACH.

16. The base station device according to claim 9, wherein the current frequency domain position of the PRACH comprises an initial default frequency domain position of the PRACH.

* * * * *